US010821816B1

(12) United States Patent
Chow et al.

(10) Patent No.: US 10,821,816 B1
(45) Date of Patent: Nov. 3, 2020

(54) DETACHABLE ELECTRIFIED POWERTRAIN COMPONENTS

(71) Applicant: Toyota Motor Engineering & Manufacturing North America, Inc., Plano, TX (US)

(72) Inventors: Justin J. Chow, Los Angeles, CA (US); Joshua D. Payne, Ann Arbor, MI (US); Nathan C. Westover, New Hudson, MI (US); Robert C. MacArthur, Ypsilanti, MI (US); Shannon Alicia Wrobel, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/451,550

(22) Filed: Jun. 25, 2019

(51) Int. Cl.
*B60K 1/02* (2006.01)
*B60K 7/00* (2006.01)
*B60K 1/00* (2006.01)

(52) U.S. Cl.
CPC .............. *B60K 1/02* (2013.01); *B60K 7/0007* (2013.01); *B60K 2001/001* (2013.01)

(58) Field of Classification Search
CPC ... B60K 1/02; B60K 7/0007; B60K 2001/001
See application file for complete search history.

(56) References Cited

U.S. PATENT DOCUMENTS

| | | | |
|---|---|---|---|
| 5,760,569 A | 6/1998 | Chase, Jr. | |
| 9,358,895 B2 * | 6/2016 | Avganim | B60L 50/66 |
| 9,457,666 B2 * | 10/2016 | Caldeira | B60L 58/16 |
| 2010/0291427 A1 * | 11/2010 | Zhou | B60L 50/16 |
| | | | 429/100 |
| 2011/0084664 A1 * | 4/2011 | White | B60L 53/64 |
| | | | 320/134 |
| 2012/0303397 A1 * | 11/2012 | Prosser | B60L 53/00 |
| | | | 705/7.12 |
| 2015/0134467 A1 | 5/2015 | Penilla et al. | |

FOREIGN PATENT DOCUMENTS

| | | |
|---|---|---|
| CN | 201325534 Y | 10/2009 |
| CN | 202309191 U | 7/2012 |
| CN | 203666368 U | 6/2014 |
| JP | 2003102110 A | 4/2003 |
| JP | 2007238013 A | 9/2007 |
| JP | 2014084034 A | 5/2014 |

* cited by examiner

*Primary Examiner* — John D Walters
*Assistant Examiner* — James J Triggs
(74) *Attorney, Agent, or Firm* — Christopher G. Darrow; Darrow Mustafa PC

(57) ABSTRACT

An apparatus includes a propulsion module for a vehicle, and a control module communicatively connected to the propulsion module. The propulsion module is structured to be detached from the vehicle for mechanical connection to an off-board device. The propulsion module includes an electric motor and a power supply, and the power supply is operable to power the electric motor to output mechanical power. The control module is configured to receive a connection status of the propulsion module. In response to the connection status indicating that the propulsion module is detached from the vehicle, the control module is configured to operate the power supply at an off-board rated power to power the electric motor.

20 Claims, 5 Drawing Sheets

US 10,821,816 B1

DETACHABLE ELECTRIFIED POWERTRAIN COMPONENTS

TECHNICAL FIELD

The embodiments described herein generally relate to vehicles and, more particularly, to vehicles that have electrified powertrains.

BACKGROUND

Many vehicles are electrified vehicles or, in other words, vehicles that have an electrified powertrain. In its most basic form, the electrified powertrain of a hybrid electric vehicle includes one or more compact electric motors that complement a gasoline- or diesel-burning engine to propel the vehicle. On the other end of the spectrum, the electrified powertrain of a fully electric vehicle incorporates one or more electric motors to propel the vehicle. In these and other implementations of vehicles that have an electrified powertrain, each of the electric motors is coupled to other electrified powertrain components, such as an inverter, an energy storage device, etc., that together convert electrical energy to mechanical energy for propulsion.

SUMMARY

In addition to being parked, electrified vehicles are sometimes underutilized for portions of their lifespan. Disclosed herein are embodiments associated with extending the usage of otherwise idle or underutilized electrified powertrain components. In one aspect, an apparatus includes a propulsion module for a vehicle, and a control module communicatively connected to the propulsion module. The propulsion module is structured to be detached from the vehicle for mechanical connection to an off-board device. The propulsion module includes an electric motor and a power supply, and the power supply is operable to power the electric motor to output mechanical power. The control module is configured to receive a connection status of the propulsion module. In response to the connection status indicating that the propulsion module is detached from the vehicle, the control module is configured to operate the power supply at an off-board rated power to power the electric motor.

In another aspect, a vehicle includes a wheel mechanically coupled to an electric motor, a power supply, a propulsion module, and a control module communicatively connected to the propulsion module. The power supply is operable to power the electric motor to output mechanical power. The propulsion module is structured to be detached from the vehicle for mechanical connection to an off-board device, and includes the electric motor and the power supply. The control module is configured to receive a connection status of the propulsion module. In response to the connection status indicating that the propulsion module is detached from the vehicle, the control module is configured to operate the power supply at an off-board rated power to power the electric motor.

In yet another aspect, an apparatus includes a propulsion module for a vehicle, and a control module communicatively connected to the propulsion module. The propulsion module is structured to be detached from the vehicle for mechanical connection to an off-board device. The propulsion module includes a electric motor and a power supply having an inverter and a charger, and the power supply is operable to power the electric motor to output mechanical power. The control module is configured to receive a connection status of the propulsion module. In response to the connection status indicating that the propulsion module is detached from the vehicle, the control module is configured to operate the power supply at an off-board rated power to power the electric motor.

Embodiments of the present application can be more clearly understood with relation to the figures and the description below.

BRIEF DESCRIPTION OF THE DRAWINGS

So that the manner in which the above recited features of the present disclosure can be understood in detail, a more particular description of the disclosure, briefly summarized above, may be had by reference to the embodiments, some of which are illustrated in the appended drawings. It is to be noted, however, that the appended drawings illustrate only typical embodiments of this disclosure and are therefore not to be considered limiting of its scope. The disclosure may admit to other equally effective embodiments.

To facilitate understanding, identical reference numerals have been used, wherever possible, to designate identical elements common to the Figures. Additionally, elements of one embodiment may be advantageously adapted for utilization in other embodiments described herein.

DETAILED DESCRIPTION

This disclosure teaches an apparatus and a vehicle associated with extending the usage of electrified powertrain components by structuring them for detachment from the vehicle for mechanical connection to off-board devices. The specific electrified powertrain components of interest are one or more electric motors and attendant components coupled to the electric motors, such as power supplies.

Each of the electric motors may be structured to be detached from the vehicle when, for example, the vehicle is not is use, the vehicle does not currently need the electric motor, etc. Once detached, the electric motor may be used to provide mechanical power to off-board devices, such as jobsite tools, machine shop tools, etc. For each electric motor, the vehicle includes one or more other electrified powertrain components that supply and control electrical power to the electric motor, and those electrified powertrain components may also be structured to be detached from the vehicle. For example, the electrified powertrain components may include a DC/AC inverter and one or more traction battery modules that together may be used as a power supply to power the electric motor. Leveraging the electric motor in this fashion increases the productivity of the electric motor and extends its usage to other applications.

Figure 1A:
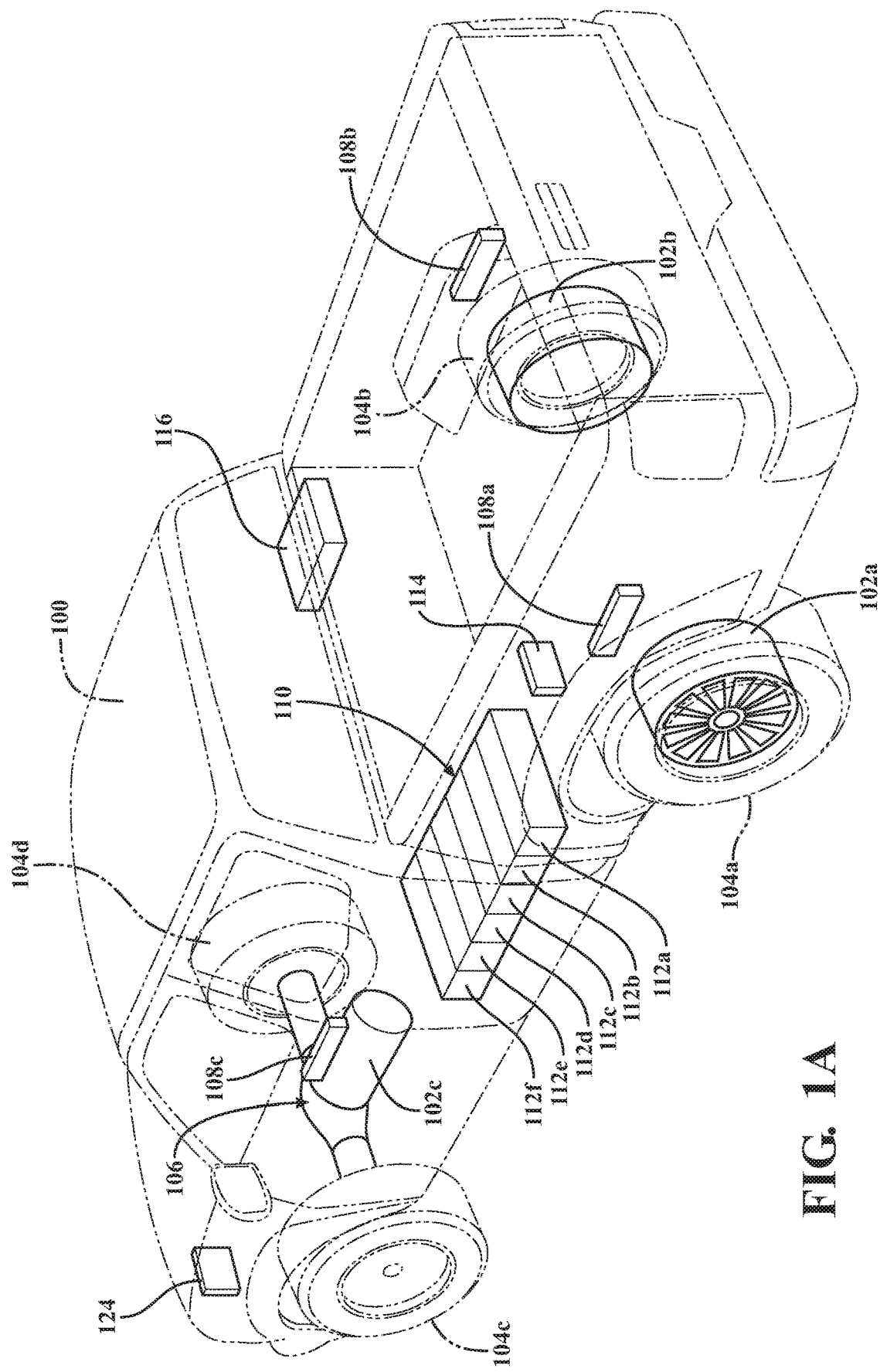
FIG. 1A is a perspective view of a representative electrified vehicle that includes electrified powertrain components, showing propulsion modules attached to the vehicle.
Figure 1B:
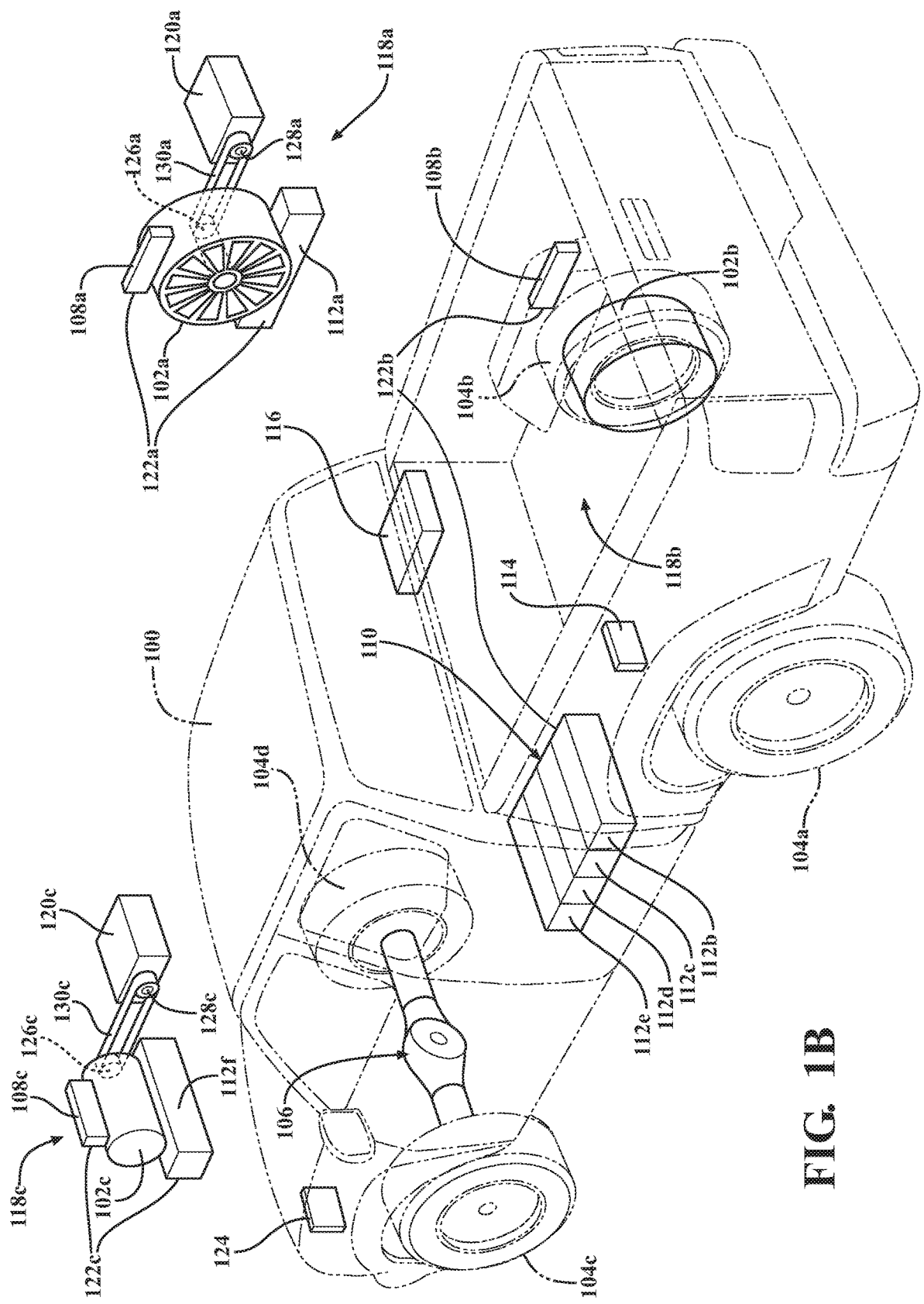
FIG. 1B is a perspective view of the vehicle, showing two propulsion modules detached from the vehicle for mechanical connection to off-board devices.

With reference to FIGS. 1A-1B, a vehicle 100 is shown as a representative electrified vehicle that includes electrified powertrain components. As used herein, a "vehicle" is any form of electrified motorized transport that includes, among the electrified powertrain components, an electric motor 102 structured to be detached from and reattached to the vehicle 100, as set forth below. In one or more implementations, the vehicle 100 is an automobile, for example, a hybrid electric vehicle ("HEV"), a pure electric vehicle ("EV"), a plug-in hybrid vehicle ("PHEV"), an extended range electric vehicle ("EREV"), etc. While arrangements will be described herein with respect to automobiles, it will be understood that embodiments are not limited to automobiles. In some implementations, the vehicle 100 may be any other form of electrified motorized transport that, for example, benefits from the systems and methods as discussed herein.

Some of the possible elements of the vehicle 100 are shown in FIGS. 1A-1B and will now be described. It will be understood that in various embodiments it may not be necessary for the vehicle 100 to have all of the elements shown in FIGS. 1A-1B. The vehicle 100 can have any combination of the various elements shown in FIGS. 1A-1B. Further, the vehicle 100 can have additional elements to those shown in FIGS. 1A-1B. While the various elements are shown as being located within the vehicle 100 in FIGS. 1A-1B, it will be understood that one or more of these elements can be located external to the vehicle 100. Further, the elements shown may be physically separated by large distances.

The vehicle 100 includes any combination of one or more hub motors, one or more traction motors and like electric motors 102. Moreover, the vehicle 100 includes one or more wheels 104 powered by the electric motors 102. For example, the vehicle 100 includes multiple electric motors 102, including a hub motor 102a, a hub motor 102b and a traction motor 102c, and multiple wheels 104, including wheels 104a-104d, as shown in FIG. 1A. The electric motors 102 and the wheels 104 may be supported by a chassis of the vehicle 100. For example, the vehicle 100 includes a drivetrain 106. The drivetrain 106 is part of, mounted to or otherwise supported by the chassis of the vehicle 100, and includes the wheels 104. In addition to the wheels 104, the drivetrain 106 may include any penultimate combination of drivetrain components to which the wheels 104 and the electric motors 102 are mechanically connected. With the wheels 104 remaining attached to the vehicle 100 as part of the drivetrain 106, one, some or all of the electric motors 102 are structured to be detached from and reattached to the vehicle 100, as set forth below.

The hub motors 102a and 102b are mechanically coupled directly to the wheels 104a and 104b, respectively, and the wheels 104a and 104b are powered by the individual hub motors 102a and 102b. The hub motors 102a and 102b may be three-phase high-voltage AC electric motors. The hub motors 102a and 102b are structured to be detached from and reattached to the vehicle 100, as set forth below, and may be mechanically disconnected and reconnected to the wheels 104a and 104b. Accordingly, the wheels 104a and 104b may remain attached to the vehicle 100, as demonstrated in FIG. 1B, so that the vehicle 100 may be powered from another electric motor 102, as discussed in detail in connection with FIGS. 1B-1E.

The traction motor 102c is mechanically coupled indirectly to the wheels 104c and 104d via the drivetrain 106, and the wheels 104c and 104d are powered by the traction motor 102c. The traction motor 102c may be a three-phase high-voltage AC electric motor. The drivetrain 106 includes the wheels 104c and 104d, and any penultimate combination of drivetrain components, e.g., a transmission, a differential, a driveshaft, an axle, etc., to which the wheels 104c and 104d and the traction motor 102c are mechanically connected. The traction motor 102c is structured to be detached from and reattached to the vehicle 100, as set forth below, and may be mechanically disconnected from and reconnected to the drivetrain 106. Accordingly, the wheels 104c and 104d may remain attached to the vehicle 100, as demonstrated in FIG. 1B, so that the vehicle 100 may be powered from another electric motor 102, as discussed in detail in connection with FIGS. 1B-1E.

The vehicle 100 includes additional electrified powertrain components that, together with the electric motors 102, provide mechanical power to the wheels 104. For example, as shown in FIG. 1A, the vehicle 100 includes one or more inverters 108, and a traction battery 110 having one or more battery modules 112, including multiple battery modules 112a-f. The traction battery 110, including one or more of the battery modules 112, is coupled to the electric motors 102 via the inverters 108. Each of the inverters 108 is operable to condition electrical energy from the traction battery 110 and the battery modules 112. In the vehicle 100, an inverter 108 may be associated with each of the electric motors 102. For example, FIG. 1A shows two inverters 108a and 108b associated with the hub motors 102a and 102b, respectively, and one inverter 108c associated with the traction motor 102c. The vehicle 100 can have fewer or additional electrified powertrain components to those shown in FIGS. 1A. For example, alternatively or in addition to the traction battery 110 and the battery modules 112, one or more fuel cells (not shown) may be coupled to the electric motors 102 via the inverters 108.

For each associated electric motor 102, one or more wheels 104 and inverter 108, the inverter 108 is operable to convert DC electrical energy from the traction battery 110, including one or more of the battery modules 112, into three-phase AC electrical energy for use by the electric motor 102. For instance, the three-phase AC electrical energy may be high-voltage AC electrical energy. The electric motor 102 is operable to power the wheels 104 using electrical energy from the inverter 108. The inverter 108 may be operable to electrically configure itself to output electrical power that corresponds to powering the electric motor 102 at various power levels. The inverter 108 may be configured for communicating with other devices via various wired and/or wireless networking technologies (e.g., cellular, BLUETOOTH®, a universal serial bus (USB), wired and/or wireless packet networks, etc.). As described below, the inverter 108 may be structured to be detached from and reattached to the vehicle 100.

The traction battery 110 may be or include one or more rechargeable batteries. The rechargeable batteries may be grouped together into the battery modules 112. The traction battery 110, including one or more of the battery modules 112, may include monitoring sensors operable to detect information about the traction battery 110 and the battery modules 112, such as voltage, current and temperature sensors respectively operable to detect one or more voltages, one or more currents and one or more temperatures of the traction battery 110 and the battery modules 112. The traction battery 110, including one or more of the battery modules 112, may include switching devices, such as relays, contactors, solid state switches, etc., operable to halt the flow of energy to/from the traction battery 110 and the battery modules 112 based on data obtained from the monitoring sensors. As set forth below, the traction battery 110, including one or more of the battery modules 112, may be structured to be detached from and reattached to the vehicle 100.

The vehicle 100 can include a battery management module ("BMM") 114 coupled to the traction battery 110, including one or more of the battery modules 112. The BMM 114 may be operable to control and manage the charging and discharging of the traction battery 110 and the battery modules 112, including when the traction battery 110 and the battery modules 112 are attached to the vehicle 100, and when the traction battery 110 and the battery modules 112 are detached from the vehicle 100. The BMM 114 processes the data obtained from the monitoring sensors and controls the connection of the traction battery 110 and the battery modules 112 to other components of the vehicle 100, including a propulsion system 132 and one or more vehicle systems 156 (both systems discussed in detail in connection with FIG. 1C). The BMM 114 may process the data obtained from the monitoring sensors to determine a state of charge ("SOC") of the traction battery 110 and the battery modules 112, as well as other states thereof, e.g., available energy, instantaneous voltage, cell/module/pack temperature, etc. The BMM 114 may determine whether to halt the flow of energy to/from the traction battery 110 and the battery modules 112 based on the states thereof by commanding the switching devices to open electrical circuits between the traction battery 110 and the other components of the vehicle 100. The BMM 114 may be structured to be detached from and reattached to the vehicle 100, as discussed below.

The vehicle 100 can include a charger 116. The charger 116 may be coupled to the traction battery 110, including one or more of the battery modules 112, and may be connectable to a commercial power source to supply current for charging the traction battery 110 and the battery modules 112. The vehicle 100 may include an outlet (not shown) accessible from an exterior of the vehicle 100 that is coupled to the charger 116. The charger 116 may receive AC electrical energy via the outlet from the commercial power source, e.g., from a 120/240 Volt AC standard electrical outlet connected to a power grid. The charger 116 may convert the AC electrical energy to DC electrical energy so that it can then be used to charge the traction battery 110 and the battery modules 112. Similarly, the charger 116 may be structured to be detached from and reattached to the vehicle 100, as set forth below, and used to supply DC electrical energy to the one or more inverters 108.

With reference to FIG. 1B, the vehicle 100 can include one or more propulsion modules 118. Each of the propulsion modules 118 includes one or more of the above-described electrified powertrain components structured to be detached from and reattached to the vehicle 100. Accordingly, each of the propulsion modules 118 is structured to be detached from and reattached to the vehicle 100 as well. In one arrangement, each of the propulsion modules 118 includes an electric motor 102 and a power supply 122. In relation to the electric motor 102, the power supply 122 includes one or more attendant electrified powertrain components by which the power supply 122 is operable to power the electric motor 102 to output mechanical power. For example, the vehicle 100 includes multiple propulsion modules 118, including a propulsion module 118a that includes the hub motor 102a and a power supply 122a operable to power to the hub motor 102a to output mechanical power, a propulsion module 118b that includes the hub motor 102b and a power supply 122b operable to power to the hub motor 102b to output mechanical power, and a propulsion module 118c that includes the traction motor 102c and a power supply 122c operable to power to the traction motor 102c to output mechanical power. For example, as shown in FIG. 1B, two propulsion modules 118a and 118c are detached from the vehicle 100 for mechanical connection to off-board devices 120a and 120c, and notwithstanding the propulsion modules 118a and 118c being detached from the vehicle 100, the power supplies 122a and 122c are operable to power the hub motor 102a and the traction motor 102c, respectively, to output mechanical power.

Each of the propulsion modules 118 may be attached, or for that matter reattached, to the vehicle 100 such that the power supply 122 is operable to power the electric motor 102 to output mechanical power to the wheels 104. For instance, as shown in FIG. 1A, all of the propulsion modules 118 are attached to the vehicle 100. However, as shown in FIG. 1B, only one of the propulsion modules 118, namely the propulsion module 118b, is attached to the vehicle 100. It should be appreciated that the propulsion module 118b may also be detached from the vehicle 100 for mechanical connection to another off-board device (not shown). However, detaching all of the propulsion modules 118 would leave the vehicle 100 without any electric motors 102 to effect movement of the vehicle 100, as discussed further below.

In one arrangement, in each of the propulsion modules 118, an inverter 108 and the traction battery 110, including one or more of the battery modules 112, form the power supply 122 for powering the electric motor 102. For example, when the propulsion module 118 is attached to the vehicle 100, the power supply 122 may include one or more of the battery modules 112, including the entire traction battery 110, i.e., all of the battery modules 112a-f. For example, when the propulsion module 118 is detached from the vehicle 100, the power supply 122 may include one or more of the battery modules 112 detached from the traction battery 110, or the entire traction battery 110 detached from the vehicle 100. In one arrangement, the BMM 114 may be detached from the vehicle 100 to locally control and manage the charging and discharging of the traction battery 110 and the battery modules 112 as part of the propulsion module 118. With reference to FIG. 1B, for example, in the propulsion modules 118a and 118c, the power supplies 122a and 122c include the battery modules 112a and 112f, respectively, detached from the traction battery 110. In the propulsion module 118b, the power supply 122b includes the remainder of the traction battery 110 attached to the vehicle 100, i.e., the battery modules 112b-e. As another example, when the propulsion module 118c is detached from the vehicle 100, the power supply 122c may include the entire traction battery 110. In this example, the propulsion modules 118a and 118b may remain attached to the vehicle 100 with no power source to effect movement of the vehicle 100. In another arrangement, when a propulsion module 118 is detached from the vehicle 100, the power supply 122 includes the inverter 108 and the charger 116, and the charger 116 is connected to a commercial power source, as set forth below.

As shown in FIGS. 1A-1B, the vehicle 100 includes a control module 124 that, in one or more arrangements, is communicatively connected to each of the propulsion modules 118. Specifically, the control module 124, in one arrangement, is communicatively connected to each of the power supplies 122. For each of the propulsion modules 118, the control module 124 is configured to operate the power supply 122 in response to a received connection status of the propulsion modules 118. Accordingly, the power supply 122 is operable to output electrical power that corresponds to powering the electrical motor 102 at various power levels, as set forth below.

For each of the propulsion modules 118 detached from the vehicle 100 for mechanical connection to an off-board device 120, the off-board device 120 may be powered by the electric motor 102. The off-board device 120 may be any device that can accept mechanical power via a mechanical linkage from the electric motor 102 to perform some function. For example, the off-board device 120 may be a jobsite or machine tool whose existing electric motor is underpowered or no longer working. For example, the off-board device 120 may be a table saw, a grinder, a wood splitter, a lathe, a bandsaw, a drill press, etc. For example, in this and other implementations, the off-board device 120 may be or include a wench, an industrial fan, a blower, a pump, etc., configured to mechanically interface with the electric motor 102. As shown in FIG. 1B, for example, for the propulsion modules 118a and 118c, the hub motor 102a is mechanically connected to the off-board device 120a, and the traction motor 102c is mechanically connected to the off-board device 120c.

For each of the propulsion modules 118 detached from the vehicle 100 for mechanical connection to an off-board device 120, the electric motor 102 may be mechanically connected to the off-board device 120 using any suitable mechanical linkage, including any combination of one or more gears (e.g., worm gears, rack and pinion gears, bevel gears, etc.), one or more threaded couplers, one or more bushings, one or more sleeves, etc. With continued reference to FIG. 1B, for the propulsion module 118a, the hub motor 102a includes, for example, a pulley 126a, that is mechanically connected to, e.g., a pulley 128a of the off-board device 120a, via a mechanical linkage 130a, e.g., a belt. Further, for the propulsion module 118c, the traction motor 102c includes, for example, a pulley 126c, that is mechanically connected to, e.g., a pulley 128c of the off-board device 120c, via a mechanical linkage 130c, e.g., a belt.

Figure 1C:
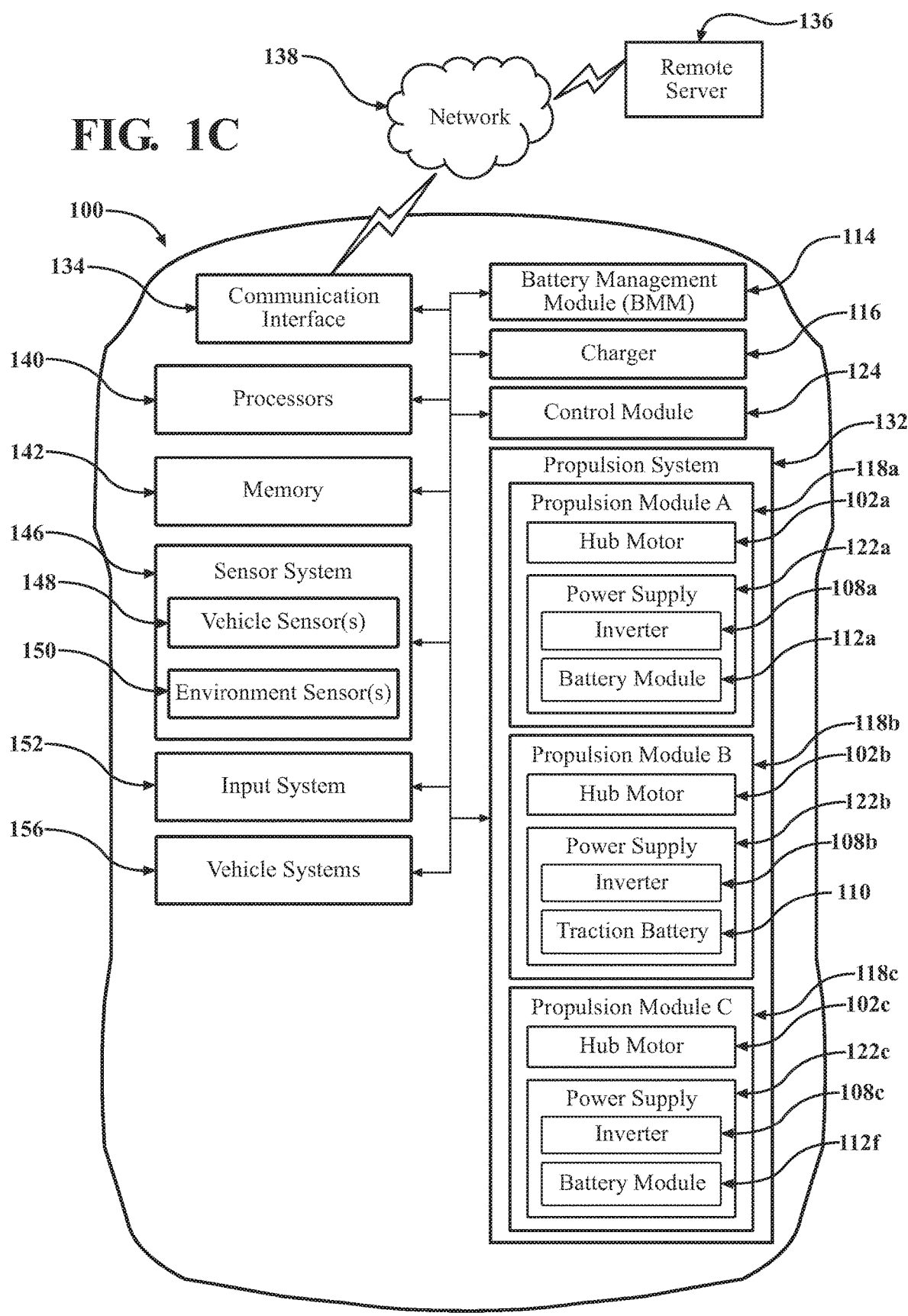
FIG. 1C illustrates additional elements of the vehicle, including a propulsion system having the propulsion modules attached to the vehicle.

Additional elements of the vehicle 100 are shown in FIG. 1C and will be described along with subsequent figures. However, a description of many of the elements in FIG. 1C will be provided after the discussion of FIGS. 1D-1E for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

The vehicle 100 can include the propulsion system 132. The propulsion system 132 includes the electrified powertrain components for providing the motive force necessary to propel the vehicle 100 as a result of a driver power demand. The propulsion system 132 may include the propulsion modules 118. The traction battery 110 may include any combination of the battery modules 112. It should be appreciated that when the propulsion modules 118 are attached to the vehicle 100, all of the battery modules 112, as part of the traction battery 110, may be shared to provide DC electrical energy to the inverters 108 for conditioning into three-phase AC electrical energy for use by the electric motors 102. In other words, the electric motors 102 may be coupled via the inverters 108 to the traction battery 110 that includes all of the battery modules 112a-f, as shown in FIG. 1A. In conjunction with the inverters 108, the electric motors 102 convert electrical energy from the traction battery 110 into mechanical power, such as torque, that may be applied to propel the vehicle 100. The vehicle 100 may include one or more additional power generation devices, such as an internal combustion engine (not shown). The internal combustion engine may be coupled to the one or more of the electric motors 102 and combust fuel to provide mechanical power in addition to the electric motors 102.

The various systems of the vehicle 100 can be communicatively linked through one or more vehicle communication networks. For example, the various systems can communicate with each other using a controller area network (CAN) bus or the like. Via the CAN bus and/or other wired or wireless mechanisms, the elements and/or systems described herein may transmit messages to various devices in the vehicle 100 and/or receive messages from the various devices, e.g., controllers, actuators, sensors, etc.

The vehicle 100 can be configured to operate via a communication interface 134 in a networked environment supporting connections to one or more remote computers for wireless communication between the vehicle 100 and a remote server 136. The vehicle 100 may include one or more processors 140. The elements and/or systems describe herein may function to control the processors 140 to transmit data to the remote server 136 via the communication interface 134 to send, for example, a request for the electric motor characteristics of the electric motors 102. Further, the elements and/or systems may receive data from the remote server 136 via the communication interface 134, for example, the electric motor characteristics of the electric motors 102.

The remote server 136 is a computer including a processor and a memory. The memory stores instructions which may be executed by the processor. The remote server 136 can communicate via a network 138 with the elements and/or systems of the vehicle 100.

The network 138 represents one or more mechanisms by which the vehicle 100 and the remote server 136 may communicate with each other. The network 138 may include one or more known networks and/or networking technologies, such as wireless communication networks (e.g., Bluetooth, IEEE 802.11, etc.), a cellular network, local area networks (LAN) and/or wide area networks (WAN), including the Internet, providing data communication services.

The communication interface 134 may be configured to establish and enable continued and uninterrupted interaction between the vehicle 100 and external sensors, other vehicles, other computer systems, various external computing and communications systems and networks (such as the network 138, a satellite system, a cellular phone/wireless communication system), and also remote users or entities, to enable and/or facilitate performance of one or more of the functions described herein. The communication interface 134 may include interfaces enabling communication in a wide area network (WAN), a wireless telecommunications network, and/or any other suitable communications networks (such as or including the network 138, for example).

With reference to FIG. 1C, in relation to the control module 124, the vehicle 100 includes the processors 140 and a memory 142 to which the control module 124 is communicatively connected. Accordingly, the processors 140 may be a part of the control module 124, the control module 124 may include a separate processor from the processors 140 of the vehicle 100 or the control module 124 may access the processors 140 through a data bus or another communication path. The processors 140, the memory 142 and the control module 124 together serve as a computing device whose control module 124 is employable to orchestrate the operation of the vehicle 100 and/or the operation of the propulsion modules 118. In either case, the processors 140 are illustrated as part of the vehicle 100 for purposes of explanation.

The memory 142 is a non-transitory computer readable medium. The memory 142 may include volatile or nonvolatile memory, or both. Examples of suitable memory 142 includes random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives or any other suitable storage medium, or any combination of these. The memory 142 includes stored instructions in program code. Such instructions are executable by the processors 140 or the control module 124. The memory 142 may be part of the processors 140 and the control module 124, or may be operatively connected to the processors 140 and the control module 124. The processors 140 and the control module 124 may store and retrieve data in the memory 142. The term "operatively connected," as used throughout this description, can include direct or indirect connections, including connections without direct physical contact.

Generally speaking, the control module 124 includes instructions that may be executed by the processors 140. The control module 124 may be implemented as computer readable program code that, when executed by the processors 140, execute one or more of the processes described herein. Such computer readable program code may be stored on the memory 142. The control module 124 may be part of the processors 140, or may be communicatively connected the processors 140.

For each of the propulsion modules 118, the control module 124 operates the power supply 122 to output electrical power that corresponds to powering the electrical motor 102 at various power levels depending on whether the propulsion module 118 is attached to or detached from the vehicle 100. Accordingly, the control module 124 receives a continuously-updated connection status of the propulsion module 118. In one arrangement, the control module 124 operates the power supply 122 at an on-board rated power to power the electric motor 102 in response to the connection status indicating that the propulsion module 118 is attached to the vehicle 100. In another arrangement, the control module 124 operates the power supply 122 at an off-board rated power to power the electric motor 102 in response to the connection status indicating that the propulsion module 118 is detached from the vehicle 100. The on-board and off-board rated powers will be discussed in more detail below.

The control module 124 may receive the connection status of the propulsion module 118 in various ways. The control module 124 may determine the connection status by communicating with any appropriately equipped component of the vehicle 100 now known or later developed, including the electric motor 102, the inverter 108, the traction battery 110, including one or more of the battery modules 112, the BMM 114 and/or the charger 116. For example, the control module 124 may receive the connection status from the electric motor 102 and/or the inverter 108 via the vehicle communication networks when the propulsion module 118 is attached to the vehicle 100. In this case, the electric motor 102 and/or the inverter 108 may transmit the connection status indicating that the electric motor 102 and the power supply 122 are attached to the vehicle 100 Likewise, in another example, the control module 124 may receive the connection status from the electric motor 102 and/or the inverter 108 wirelessly when the propulsion module 118 is detached via the network 138 and the communication interface 134. In either case, the control module 124 may determine that the electric motor 102, the inverter 108 and either the traction battery 110 or one or more of the battery modules 112 are detached from the vehicle 100 by receiving the connection status from the electric motor 102 and/or the inverter 108. In yet another example, the control module 124 may be structured to be detached from and reattached to the vehicle 100, as best illustrated and further discussed in FIG. 1E below. In this case, the control module 124 may receive the connection status from the electric motor 102 and/or the inverter 108 in a wired or wireless fashion.

The control module 124 may receive the connection status of the propulsion module 118 from the BMM 114. For example, the connection status from the BMM 114 may indicate that the electric motor 102, the inverter 108, the traction battery 110 and/or one or more of the battery modules 112 are either attached to or detached from the vehicle 100.

For the arrangement in which the power supply 122 includes the inverter 108 and the charger 116, the control module 124 may receive the connection status of the propulsion module 118 from the charger 116. For example, the connection status from the charger 116 may indicate that the electric motor 102 and the power supply 122 are either attached or detached from the vehicle 100. When detached, the charger 116 may be connected to the commercial power source, for example, a standard 120V/240V single-phase AC electrical outlet at a jobsite, and receive AC electrical energy. The charger 116 may convert the AC electrical energy to DC electrical energy for use by the inverter 108 to power the electric motor 102 to output mechanical power.

The electrified powertrain components of the propulsion module 118 are configured to operate normally when the propulsion module 118 is detached from the vehicle 100. In other words, when detached, the electrified powertrain components operate as they normally would when attached to the vehicle 100 and will not cause warning messages, errors, etc., to occur as a result of being detached.

As set forth above, in one arrangement, the power supply 122 includes an inverter 108 and one or more battery modules 112, and the BMM 114 is attached to the vehicle 100. When the propulsion module 118 is detached from the vehicle 100, any combination of the inverter 108 and the BMM 114, including the BMM 114 operating with the external inverter 108, may manage the traction battery 110, including the battery modules 112. For example, the BMM 114 may receive the state of the traction battery 110, including the battery modules 112, from another detached component. For example, the inverter 108 may communicate with the monitoring sensors of the battery modules 112 via a local CAN bus or the like. The inverter 108 may be configured to determine the state of the battery modules 112 itself or transmit monitoring sensor data to the BMM 114 via the network 138. The inverter 108 and/or the BMM 114 may determine that the state of the battery modules 112 dictates halting the flow of energy to/from the battery modules 112. In this instance, the inverter 108 may stop drawing power, or be commanded by the BMM 114 to stop drawing power, from the battery modules 112 by turning off, for example, one or more solid-state switches of the inverter 108. Thus, in this situation, the inverter 108 acts as a local switching device to protect the battery modules 112.

In one or more arrangements, the propulsion system 132 is operable to effect movement of the vehicle 100 when one or more of the propulsion modules 118 are detached from the vehicle 100. In other words, the electrified powertrain may include enough components, including one or more remaining propulsion modules 118 attached to the vehicle 100, to effect movement of the vehicle 100 despite the other propulsion modules 118 being detached. Referring to FIG. 1B, for example, the propulsion system 132 includes the remaining attached propulsion module 118b, which may be operable to effect movement of the vehicle 100. It should be appreciated that, absent additional electrified powertrain components, the vehicle 100 would no longer be capable of movement by the propulsion system 132 if the propulsion module 118b is detached.

As set forth above, for each of the propulsion modules 118, the control module 124, in one arrangement, is communicatively connected to the power supply 122 and configured to operate the power supply 122. Accordingly, the power supply 122 is operable to power the electric motor 102 to output mechanical power. Using FIG. 1B and the propulsion module 118a as an example, the control module 124 may receive the connection status indicating that the propulsion module 118a is detached from the vehicle 100 from the inverter 108a. In this instance, the control module 124 may communicate with the inverter 108a and command the inverter 108a to supply electrical power to the hub motor 102a. In response to this command, the inverter 108a may configure its one or more solid-state switches to supply the off-board rated power from the battery module 112a to the hub motor 102a.

In one arrangement, for each of the propulsion modules 118 detached from the vehicle 100 for mechanical connection to an off-board device 120, the off-board rated power corresponds to powering the electric motor 102 at a default power level. In other words, the control module 124 operates the power supply 122 by commanding the inverter 108 to supply an off-board rated power, i.e., an electrical power, that corresponds to powering the electric motor 102 at the default power level. The default power level may be an electrical or a mechanical power level that most power tools and/or machine tools operate at. The control module 124, in some instances, will not receive feedback to comprehend what type of off-board device 120 that the electric motor 102 is going to be mechanically connected to. However, the electric motor 102 can typically deliver mechanical power at levels much higher than needed for the off-board device 120. Therefore, the default power level may be safe and applicable for standard off-board devices 120, for example, 1 hp, 2 hp, 5 hp, etc.

The off-board rated power is an electrical power applied to the electric motor 102. The off-board rated power is primarily dependent upon the electrical/mechanical characteristics of the electric motor 102, and the voltage and current capabilities of the power supply 122. The off-board rated power is the electrical power that can be delivered to the electric motor 102 when the electric motor 102 is detached from the vehicle 100 and accounts for losses, e.g., inverter switching losses, voltage drops across conductors, etc. The control module 124 may modify the off-board rated power to correspond to a desired power level different from the default power level, as described below.

The control module 124 may determine the off-board rated power by identifying the electrified powertrain components and characteristics of those components included in the detached propulsion module 118. The control module 124 may receive the connection status from the inverter 108 indicating that the electric motor 102 and/or the inverter 108 is detached. The control module 124 may receive the characteristics of the electric motor 102 and the inverter 108 from a lookup table stored in the memory 142. As another example, the control module 124 may receive the characteristics of the electric motor 102 and the inverter 108 from the remote server 136. The inverter 108 may store the characteristics of the electric motor 102 and/or the inverter 108 in a memory of the inverter 108 and communicate the characteristics to the control module 124. The control module 124 may receive the connection status from the BMM 114 indicating the number of battery modules 112 detached or that the traction battery 110 is detached. In this case, the connection status from the BMM 114 may indicate the allowable voltage ranges and maximum current and temperatures. In either case, the control module 124 may determine a range for the off-board rated power from the characteristics obtained from the one or more electrified powertrain components, the remote server 136 and/or any other suitable method.

In one or more arrangements, the control module 124 via the inverter 108 limits either a speed or a torque of the electric motor 102. For example, the control module 124, in addition to receiving the connection status signal indicating that the propulsion module 118 is detached, may receive signals from one or more environment sensor 150 of a sensor system 146 indicating that the ambient exterior temperature is hot, e.g., 95 degrees Fahrenheit. The control module 124 may derate the torque of the electric motor 102 via the inverter 108 to keep the inverter 108 and/or the electric motor 102 from overheating. The inverter 108 or an interface between the inverter 108 and the electric motor 102 may include motor current and motor shaft speed sensing capabilities such that the torque and/or the speed of the electric motor 102 can be controlled by the control module 124 and the inverter 108. In the case of an external inverter, the control module 124 may limit either the speed or the torque of the electric motor 102 via the external inverter.

The control module 124, in one arrangement, modifies the off-board rated power to correspond to powering the electric motor 102 at a specified power level. The control module 124 may receive the specified power level from a lookup table stored in the memory 142. In one or more arrangements, the control module 124 is configured to receive the specified power level from at least one of a mobile device, the off-board device 120, e.g., the off-board device 120a and/or 120c shown in FIG. 1B, and the remote server 136 (discussed in detail below in connection with FIGS. 1D-1E).

The specified power level may be an electrical or a mechanical power level. The specified power level may be an electrical or a mechanical power rating of the off-board device 120. The electrical or mechanical power rating may be received by the control module 124 from the at least one of the mobile device, the off-board device 120 and the remote server. The control module 124 may determine the off-board rated power that corresponds to powering the electric motor 102 at the mechanical or electrical power level, i.e., the specified power level.

As set forth above, the propulsion modules 118 may also be attached or reattached to the vehicle 100. In one arrangement, for each of the propulsion modules 118 attached to the vehicle 100, the control module 124 is configured to, in response to the connection status indicating that the propulsion module 118 is attached to the vehicle 100, operate the power supply 122 at an on-board rated power to power the electric motor 102. The on-board rated power is an electrical power that can be delivered to the electric motor 102 when the electric motor 102 is attached to the vehicle 100. The on-board rated power accounts for losses, e.g., inverter switching losses, voltage drops across conductors, etc. The on-board rated power is typically much higher than the off-board rated power, for example, 15 kW, 100 kW, 300 kW, etc. The control module 124 may determine the on-board rated power using any suitable method, for example, similar methods discussed above for the off-board rated power.

Referring back to FIG. 1A once again as an example, when all of the propulsion modules 118 are attached to the vehicle 100, the electric motors 102, i.e., the hub motor 102a, the hub motor 102b and the traction motor 102c, are mechanically coupled to the wheels 104. Accordingly, the control module 124, in one arrangement, operates the power supplies 122 at the on-board rated power that corresponds to powering the electric motors 102 at a specified power level. The specified power level may be determined from a driver power demand received by the control module 124. The driver power demand may be output by, for example, the propulsion system 132, the one or more vehicle systems 156 (e.g., a throttle system, a regenerative braking system, etc.), etc. In one or more arrangements, the control module 124 is configured to, in response to the driver power demand, operate the power supply 122 at the on-board rated power that corresponds to powering the electric motor 102 at the specified power level which satisfies the driver power demand.

Figure 1D:
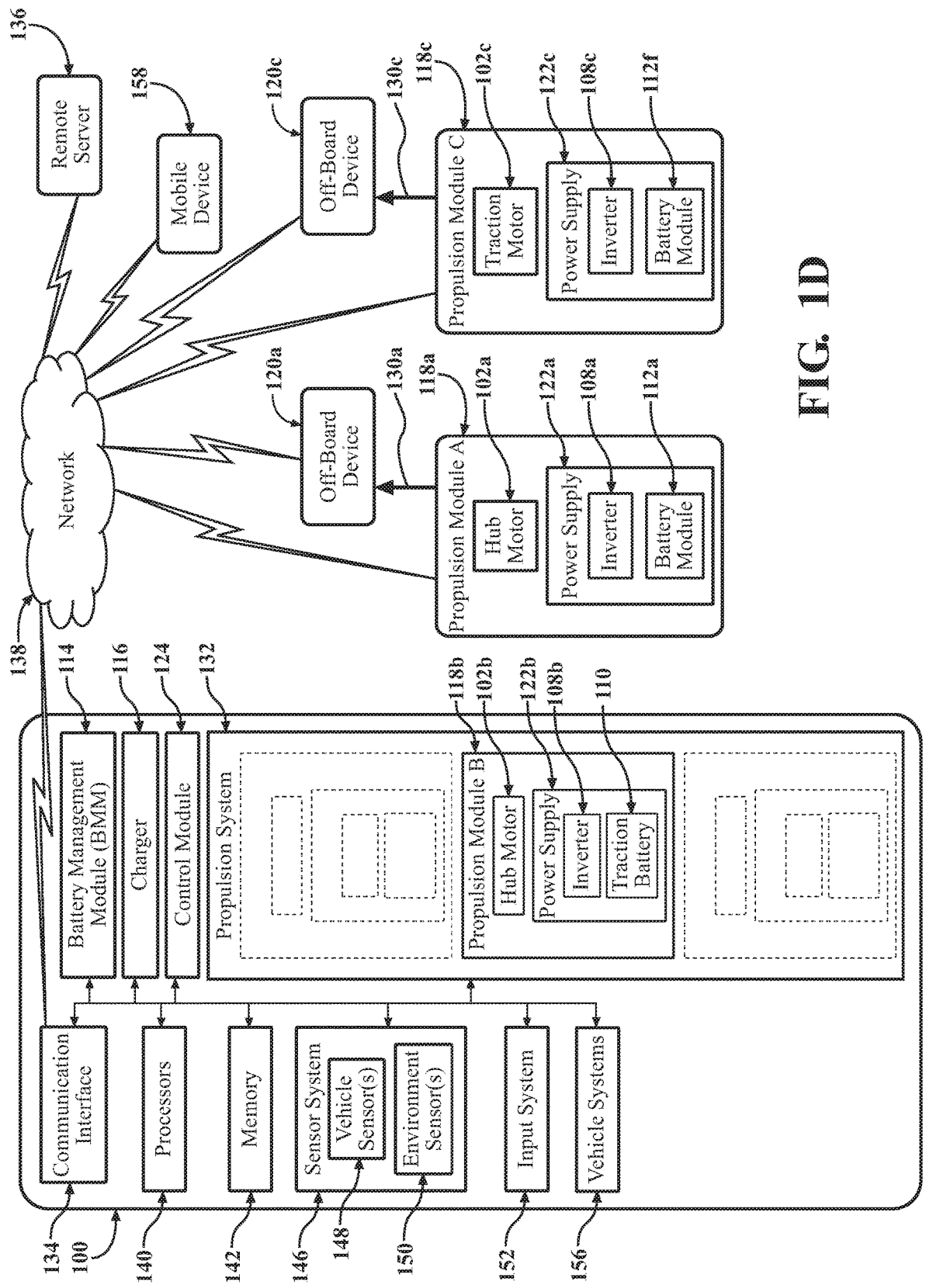
FIG. 1D is a schematic representation of the propulsion system partitioned into the two detached propulsion module scenario of FIG. 1B.

As examples of how the propulsion system 132 may be partitioned when one or more of the propulsion modules 118 are detached from the vehicle 100, FIGS. 1D-1E will now be discussed. FIG. 1D illustrates the detached propulsion module scenario of FIG. 1B, in which the vehicle 100 has detached propulsion modules 118a and 118c. The control module 124 may receive the connection status of the hub motor 102a, the traction motor 102c and the power supplies 122a and 122c from the inverters 108a and 108c, respectively. The control module 124 receives the connection status signals wirelessly, via the network 138 and the communication interface 134, indicating that the propulsion modules 118a and 118c are detached. In response to the receiving the connection status, the control module 124 may operate both of the power supplies 122a and 122c at their respective off-board rated powers to power the hub motor 102a and the traction motor 102c, respectively. The propulsion system 132 that includes the remaining attached propulsion module 118b may be operable to effect movement of the vehicle 100. In other words, in response to the receiving the connection status indicating the propulsion module 118b is attached from the inverter 108b, the control module 124 may operate the power supply 122b at the on-board rated power to power the hub motor 102b to effect movement of the vehicle 100. The control module 124 may operate the power supply 122b at the on-board rated power that corresponds to powering the hub motor 102b at the specified power level that satisfies the driver power demand received by the control module 124. In this case, the vehicle 100 includes the traction battery 110 having battery modules 112b-e to supply the DC electrical energy to the inverter 108b.

The off-board devices 120a and 120c are connected to the propulsion modules 118a and 118c via the mechanical linkages 130a and 130c, respectively, as shown in FIG. 1D. For example, the off-board devices 120a and 120c may be table saws needing replacement electric motors at a jobsite. In this case, the mechanical linkages 130a and 130b may be a belts connected to pulleys, for example, pulleys 126a, 126c, 128a and 128c, as shown in FIG. 1B.

For each of the propulsion modules 118 detached from the vehicle 100 for mechanical connection to an off-board device 120, the control module 124 may operate the power supply 122 by commanding the inverter 108 to supply the off-board rated power that corresponds to powering the electric motor 102 at the default power level. Alternatively, the control module 124 may receive the specified power level from a mobile device 158 and/or the remote server 136, as shown in FIG. 1D. A user of the off-board device 120 may enter the specified power level for the off-board device 120 via, e.g., an application running on the mobile device 158, a software program running on the remote server 136, an input system 152 of the vehicle 100 having a touch display, etc. The specified power level may be the electrical or the mechanical power rating of the off-board device 120. The control module 124 may communicate with the mobile device 158 and/or the remote server 136 via the communication interface 134. The control module 124 may output a message indicating, for example, a maximum allowable mechanical power that the electric motor 102 can deliver, the specified power level entered by the user is not valid, etc.

The control module 124 may receive the specified power level from the off-board device 120 itself, for example, in an implementation in which the off-board device 120 is a smart tool. The off-board device 120 may be activated to communicate with the control module 124 via the network 138 when, for example, the off-board device 120 is switched on, the off-board device 120 is mechanically connected to the propulsion module 118, etc. The off-board device 120 may include, e.g., dials, buttons, touch pad or the like, that are user configurable to indicate the specified power level. Accordingly, once the specified power level is received, the off-board device 120 may communicate this specified power level to the control module 124 for powering the electric motor 102 at the off-board rated power that corresponds to powering the electric motor 102 at the specified power level.

Figure 1E:
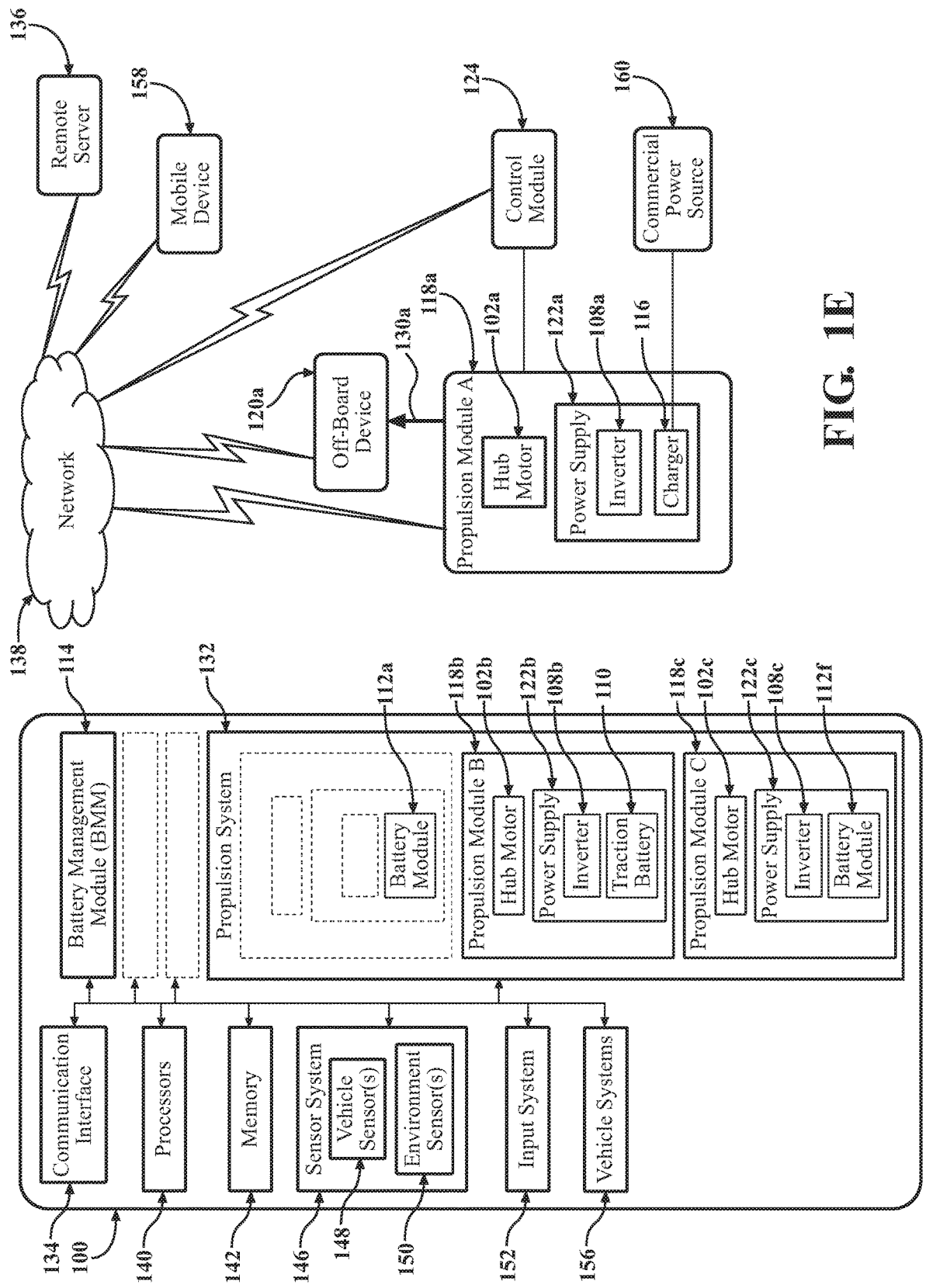
FIG. 1E is a schematic representation of the propulsion system partitioned into another detached propulsion module scenario, showing a detached control module and a detached charger used as a DC electrical energy source.

FIG. 1E illustrates the propulsion system 132 partitioned into another detached propulsion module scenario. Using the propulsion module 118a as a representative example, when the propulsion module 118a is detached from the vehicle 100 for mechanical connection to the off-board device 120a, the power supply 122a includes the inverter 108a and the charger 116. Compared to the detached propulsion module scenario of FIGS. 1B and 1D, the DC electrical energy source of the power supply 122a is now the charger 116 instead of the battery module 112a. The charger 116 receives AC electrical energy from a commercial power source 160, for example, an electrical outlet connected to a power grid accessible from a jobsite where the off-board device 120a is located. The AC electrical energy is converted to DC electrical energy for use by the inverter 108a to power the hub motor 102a.

Once again using the propulsion module 118a as a representative example, the control module 124 is shown in FIG. 1E as being detached from the vehicle and associated with the propulsion module 118a. In this case, the propulsion module 118a can be standalone and not depend on wireless communication with the vehicle 100. In other words, wireless and/or wired communication between the propulsion module 118a and the vehicle 100 is not needed to power the hub motor 102a. The control module 124 may receive the connection status from the inverter 108a and/or the charger 116, as well as determine that the control module 124 itself is detached from the vehicle 100. The control module 124 may operate the power supply 122a at the off-board rated power that corresponds to powering the hub motor 102*a* at the default power level. Alternatively, the control module 124 may receive the specified power level from the mobile device 158, the remote server 136 and/or the off-board device 120*a* and operate the power supply 122*a* at the off-board rated power corresponding to powering the hub motor 102*a* at the specified power level. Additionally, the control module 124 may be associated with more than one propulsion module 118, for example, propulsion modules 118*a*, 118*b* and 118*c*, and the propulsion modules 118 may be operable in a standalone mode as described immediately above.

The propulsion system 132 of the vehicle 100 in FIG. 1E may be operable to effect movement of the vehicle when both the propulsion module 118*a* and the control module 124 are detached from the vehicle 100. For example, the propulsion system 132 may include the one or more processors 140 for operating the power supplies 122 attached to the vehicle 100. The one or more processors 140 may determine that the control module 124 is detached from the vehicle, for example, due to the lack of communication between the control module 124 and the one or more processors 140. Accordingly, the one or more processors 140 may operate the power supplies 122*b* and 122*c* at the on-board rated power to power the hub motor 102*b* and the traction motor 102*c*. The on-board rated power may correspond to powering the hub motor 102*b* at the specified power level that satisfies the driver power demand as received by the one or more processors 140.

Alternatively, the functionality of the control module 124 may be built into the inverter 108*a*, and the inverter 108*a* may be configured to operate the power supply 122*a* at the off-board rated power that corresponds to powering the hub motor 102*a* at the, for example, default power level. The control module 124 may be needed, for example, to power the hub motor 102*a* at the specified power level, as received by the mobile device 158, the remote server 136 and/or the off-board device 120 via the network 138.

FIG. 1C will now be discussed in full detail as an example environment within which the system and methods disclosed herein may operate. The vehicle 100 can include the one or more processors 140. "Processor" means any component or group of components configured to execute any of the processes described herein or any form of instructions to be carried out such processes or cause such processes to be performed. The processors 140 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processors 140 can include at least one hardware circuit (e.g., an integrated circuit) configured to carry out instructions contained in program code. In arrangements in which there is a plurality of processors 140, such processors can work independently from each other or one or more processors can work in combination with each other. In one or more arrangements, the processors 140 can be a main processor of the vehicle 100.

As noted above, the vehicle 100 can include the sensor system 146. The sensor system 146 can include one or more sensors. "Sensor" means any device, component and/or system that can detect, and/or sense something. The one or more sensors can detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 146 includes a plurality of sensors, the sensors can work independently from each other. Alternatively, two or more of the sensors can work in combination with each other. In such case, the two or more sensors can form a sensor network. The sensor system 146 and/or the one or more sensors can be operatively connected to the processors 140, the memory 142, and/or other elements of the vehicle 100 (including any of the elements shown in FIG. 1C).

The sensor system 146 can include any suitable type of sensor. For instance, the sensor system 146 can include one or more vehicle sensors 148, which can detect, determine, and/or sense information about the vehicle 100 itself (e.g., position, orientation, speed, acceleration, deceleration, direction, accelerator pedal position, brake pedal position, pedal position, steering wheel position, etc.). In one or more arrangements, the one or more vehicle sensors 148 can include various inertial sensors such as gyroscopes and accelerometers, speedometers, vehicle wheel speed sensors, road condition sensors, suspension height sensors, steering angle sensors, steering torque sensors, brake pedal pressure sensors, accelerator pedal pressure sensors, pedal position sensors, and/or tire pressure sensors, just to name a few possibilities.

Alternatively, or in addition, the sensor system 146 can include the one or more environment sensors 150, which can be configured to acquire, and/or sense data or information about the external environment in which a vehicle is located or one or more portions thereof. For example, such data or information can be related to obstacles in at least a portion of the external environment of the vehicle 100 and/or other things in the external environment of the vehicle 100, such as, for example, lane markers, signs, traffic lights, traffic signs, lane lines, crosswalks, curbs proximate the vehicle 100, off-road objects, etc. In one or more arrangements, the sensor system 146 can include one or more radar sensors, one or more LIDAR sensors, one or more sonar sensors, one or more cameras, and/or one or more ranging sensors.

The vehicle 100 can include the input system 152. An "input system" includes any device, component, system, element or arrangement or groups thereof that enable information/data to be entered into a machine. The input system 152 can be configured to receive an input from a vehicle occupant (e.g. a driver or a passenger).

The vehicle 100 can include the one or more vehicle systems 156. Various examples of the one or more vehicle systems 156 can include a braking system, a regenerative braking system, a steering system, throttle system, a transmission system, a signaling system, a navigation system, etc. However, the vehicle 100 can include more, fewer, or different vehicle systems 156. It should be appreciated that the vehicle systems 156 can be combined or segregated via hardware and/or software within the vehicle 100. Each of these vehicle systems 156 can include one or more mechanisms, devices, elements, components, systems, and/or combination thereof, now known or later developed.

The vehicle 100 can include one or more actuators to modify, adjust and/or alter one or more of the vehicle systems 156 or components thereof to responsive to receiving signals or other inputs from the processors 140 and/or other elements of the vehicle 100. The one or more actuators can include motors, pneumatic actuators, hydraulic pistons, relays, solenoids, and/or piezoelectric actuators, just to name a few possibilities. In one or more arrangements, the vehicle 100 can include one or more pedal actuators. The one or more pedal actuators can be associated with a brake pedal and/or an accelerator pedal of the vehicle 100. The one or more pedal actuators can be operatively connected to adjust the resistance level of the brake pedal and/or the accelerator pedal.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component embedded with a defined configuration set (e.g., instructions) for performing the disclosed functions.

The vehicle 100 can include one or more modules, at least some of which are described herein. The modules can be implemented as computer readable program code that, when executed by a processor, implement one or more of the various processes described herein. One or more of the modules can be a component of the processors 140, or one or more of the modules can be executed on and/or distributed among other processing systems to which the processors 140 is operatively connected. The modules can include instructions (e.g., program logic, program logic specific to hybrid functionality, etc.) executable by the processors 140.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module. As used herein, "cause" or "causing" means to make, force, compel, direct, command, instruct, and/or enable an event or action to occur or at least be in a state where such event or action may occur, either in a direct or indirect manner.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1A-1E, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An apparatus, comprising:
    a propulsion module for a vehicle, the propulsion module structured to be detached from the vehicle for mechanical connection to an off-board device, and including an electric motor and a power supply, the power supply operable to power the electric motor to output mechanical power; and
    a control module communicatively connected to the propulsion module, the control module configured to:
        receive a connection status of the propulsion module; and
        in response to the connection status indicating that the propulsion module is detached from the vehicle, operate the power supply at an off-board rated power to power the electric motor.

2. The apparatus of claim 1, wherein the off-board rated power corresponds to powering the electric motor at a default power level.

3. The apparatus of claim 2, wherein powering the electric motor at the default power level includes limiting one of a speed and a torque of the electric motor.

4. The apparatus of claim 1 wherein the off-board rated power corresponds to powering the electric motor at a specified power level.

5. The apparatus of claim 4, wherein the control module is configured to receive the specified power level from at least one of a mobile device, the off-board device and a remote server.

6. The apparatus in claim 1, wherein the power supply includes at least one of an inverter and a battery, and the electric motor includes at least one of a hub motor and a traction motor.

7. The apparatus of claim 1, wherein the control module is configured to, in response to the connection status indicating that the propulsion module is attached to the vehicle, operate the power supply at an on-board rated power to power the electric motor.

8. The apparatus of claim 7, wherein the on-board rated power corresponds to powering the electric motor at a specified power level.

9. The apparatus of claim 8, wherein the control module is configured to, in response to a driver power demand, operate the power supply at the on-board rated power that corresponds to powering the electric motor at the specified power level which satisfies the driver power demand.

10. The apparatus of claim 1, wherein a propulsion system of the vehicle is operable to effect movement of the vehicle when the propulsion module is detached.

11. A vehicle, comprising:
    a wheel mechanically coupled to an electric motor;
    a power supply, the power supply operable to power the electric motor to output mechanical power;
    a propulsion module, the propulsion module structured to be detached from the vehicle for mechanical connection to an off-board device, and including the electric motor and the power supply; and
    a control module communicatively connected to the propulsion module, the control module configured to:
        receive a connection status of the propulsion module; and
        in response to the connection status indicating that the propulsion module is detached from the vehicle, operate the power supply at an off-board rated power to power the electric motor.

12. The vehicle of claim 11, wherein the off-board rated power corresponds to powering the electric motor at a default power level.

13. The vehicle of claim 11, wherein the off-board rated power corresponds to powering the electric motor at a specified power level, and wherein the control module is configured to receive the specified power level from at least one of a mobile device, the off-board device and a remote server.

14. The vehicle of claim 11, wherein the control module is configured to, in response to the connection status indicating that the propulsion module is attached to the vehicle, operate the power supply at an on-board rated power to power the electric motor.

15. The vehicle of claim 14, wherein the control module is configured to, in response to a driver power demand, operate the power supply at the on-board rated power that corresponds to powering the electric motor at a specified power level which satisfies the driver power demand.

16. The vehicle of claim 11, wherein a propulsion system of the vehicle is operable to effect movement of the vehicle when the propulsion module is detached.

17. An apparatus, comprising:
    a propulsion module for a vehicle, the propulsion module structured to be detached from the vehicle for mechanical connection to an off-board device, and including an electric motor and a power supply having an inverter and a charger, the power supply operable to power the electric motor to output mechanical power; and
    a control module communicatively connected to the propulsion module, the control module configured to:
        receive a connection status of the propulsion module; and
        in response to the connection status indicating that the propulsion module is detached from the vehicle, operate the power supply at an off-board rated power to power the electric motor.

18. The apparatus of claim 17, wherein the off-board rated power corresponds to powering the electric motor at a default power level.

19. The apparatus of claim 17, wherein the off-board rated power corresponds to powering the electric motor at a specified power level.

20. The apparatus of claim 19, wherein the control module is configured to receive the specified power level from at least one of a mobile device, the off-board device and a remote server.

* * * * *